United States Patent [19]

Sako et al.

[11] 4,156,127

[45] May 22, 1979

[54] ELECTRIC HEATING TUBE

[75] Inventors: Junichi Sako, Suita; Norimasa Honda, Settsu; Hideo Tokunaga, Mishima; Toshirou Hoshino, Settsu; Mitsuhiro Okamoto, Neyagawa, all of Japan

[73] Assignee: Daikin Kogyo Co., Ltd., Osaka, Japan

[21] Appl. No.: 783,496

[22] Filed: Mar. 31, 1977

[30] Foreign Application Priority Data

Apr. 6, 1976 [JP] Japan .................................. 51-42733

[51] Int. Cl.[2] .......................... H05B 3/40; H05B 3/58; F24H 1/14; F16L 11/12

[52] U.S. Cl. ....................................... 219/301; 138/33; 138/137; 138/141; 174/47; 174/110 FC; 219/300; 219/522; 219/541; 219/547; 338/214; 338/327; 338/332

[58] Field of Search ............... 219/301, 300, 543, 541, 219/522, 547; 252/511; 174/47, 110 FC; 338/327, 332, 212, 214; 138/33, 137, 140, 141, 145, DIG. 3, DIG. 6

[56] References Cited

U.S. PATENT DOCUMENTS

| | | | |
|---|---|---|---|
| 2,274,839 | 3/1942 | Marick | 219/301 UX |
| 2,730,597 | 1/1956 | Podolsky et al. | 252/511 X |
| 3,277,419 | 10/1966 | Butz | 338/212 X |
| 3,287,684 | 11/1966 | Armbruster | 219/543 X |
| 3,338,476 | 8/1967 | Marcoux | 219/300 UX |
| 3,355,572 | 11/1967 | Chrow | 219/301 |
| 3,397,302 | 8/1968 | Hosford | 338/212 X |
| 3,582,968 | 6/1971 | Buiting et al. | 219/300 |
| 3,619,560 | 11/1971 | Buiting et al. | 219/300 |
| 3,680,630 | 8/1972 | Watts | 219/300 X |
| 4,032,748 | 6/1977 | Vischer et al. | 219/300 X |

FOREIGN PATENT DOCUMENTS

| | | | |
|---|---|---|---|
| 1120482 | 7/1968 | United Kingdom | 219/301 |

*Primary Examiner*—A. Bartis
*Attorney, Agent, or Firm*—Lane, Aitken & Ziems

[57] ABSTRACT

A heating tube adapted to electrically heat a fluid carried therethrough includes an inner tubular layer of polytetrafluoroethylene, a second tubular layer surrounding the inner layer and being formed of a homogeneous mixture of polytetrafluoroethylene and electrically conductive carbon, and a third layer surrounding the second layer and being formed of polytetrafluoroethylene. The three layers are coextruded together. The third layer is cut away at at least two circumferential points and the exposed second layer is there provided with a sintered coating for finely divided silver and finely divided polytetrafluoroethylene. The sintered coating is then wrapped with a silicone resin tape containing dispersed silver particles and a metal ring is then fitted over the silicone resin tape thereby forming an electrical terminal for the heating tube.

4 Claims, 6 Drawing Figures

ELECTRIC HEATING TUBE

BACKGROUND OF THE INVENTION

This invention relates to a tube or pipe adapted for heating fluids carried therewithin.

The excellent properties of polytetrofluoroethylene (PTFE), such as non-adhesiveness, resistance to corroision and high-temperatures, have led to use of the polymer as a pipe for heating a fluid flowing therethrough. In such an application, it is the common practice to coil an electric heater wire such as nichrome wire around the pipe of PTFE. An electric current is applied to the electric heater wire to generate heat, which is transmitted through the pipe to indirectly heat the fluid. However, such heating means has a number of disadvantages as summarized below.

(1) The wire is so high in heating density per output power at the heating wire surface that the temperature of the wire becomes too high, resulting in degradation of the PTFE pipe. PTFE is degraded at a relatively low temperature of about 260° C. and melts at about 327° C. Accordingly, portions or areas of the pipe in contact with the wire tend to be degraded rather than the entirety of the pipe.

(2) For the same reason mentioned above, a heat insulating material or an electric insulating material surrounding the wire will be degraded as well as the pipe per se. In other words, there is a limitation in the choice of materials which can be employed as such insulation.

(3) The heating by an electric heater wire is not satisfactory because such heating takes place in a linear and local manner, resulting in local superheating of fluid in the pipe.

(4) In order to avoid the local superheating, the wire can be closely wound. However this leads to an increase in total resistance, so that it becomes difficult to control the amount of heat. This may be avoided by changing the diameter or material of the wire, the applied voltage, etc., but these changes will also produce technical complications.

(5) When the temperature control of the heating pipe is provided in the local heating system of the type described above, special care must be taken in positioning a temperature sensor since temperature distribution within the pipe is not uniform.

(6) Use of wire of a small diameter may risk a break in the wire.

SUMMARY OF THE INVENTION

It is therefore an object of this invention to provide a pipe, conduit or tube which is adapted for heating a fluid flowing or contained therein and which is free from the abovementioned disadvantages of the prior art apparatus.

Another object of the invention is to provide a tube for continuously and accurately heating a fluid carried therewithin, which is suitable for analytical instruments, chemical plants etc.

In accomplishing the foregoing objects, the invention provides a tube adapted to heat a fluid flowing or contained therein, which includes an elongated tubular inner layer of PTFE and an elongated tubular outer layer of a carbon filled composition of PTFE surrounding the inner layer. At least two terminal strips are provided on and in electrical contact with the outer layer so that the outer layer functions to generate heat when the terminals are connected to a source of electrical energy. The heat-generating layer preferably has a volume resistivity of about between 0.2 and 5.0 ohm-cm. The inner layer defining a passage for the fluid therethrough has excellent resistance to chemical attack by the fluid.

The outer heat generating layer may be surrounded with electrical insulation and/or heat insulation.

Thus, the electrical heating tube of the invention has the following advantages.

(1) Local superheating is prevented because the heating density per output power of the tubular heater is low. Though the tubular heater can not be used at temperatures higher than the degradation temperature (260° C.) of PTFE, it offers no obstacle to use at temperatures slightly below the degradation temperature. The heat exchange capacity of the tube may be increased up to the limit of the heat-resistant temperature of PTFE.

(2) Localized overheating is reduced to a minimum, so that electrical or heat insulation surrounding the heat generating layer is hardly damaged. Thus, a variety of materials may be satisfactorily used for the insulating purpose.

(3) Heat is uniformly generated from the entire heat generating layer so that a localized increase of temperature does not occur, ensuring easy and precise temperature control of the fluid in the tube. This also serves to prevent the fluid from being degraded by thermal decomposition or vaporization.

(4) The tubular form of the heat generating layer makes the construction of the terminal simple and tough.

(5) No special care is required in the selection of the location for the control heat sensor because local superheating is not induced.

(6) No breakdown by heat generating layer breakage takes place since the heat generating layer is in the form of a sheet, ensuring semipermanent use.

Further objects, features and advantages of the invention will become apparent as the invention is described more particularly hereinafter in connection with the accompanying drawings.

DETAILED DESCRIPTION OF THE PREFERRED EMBODIMENT OF THE INVENTION

Figure 2:
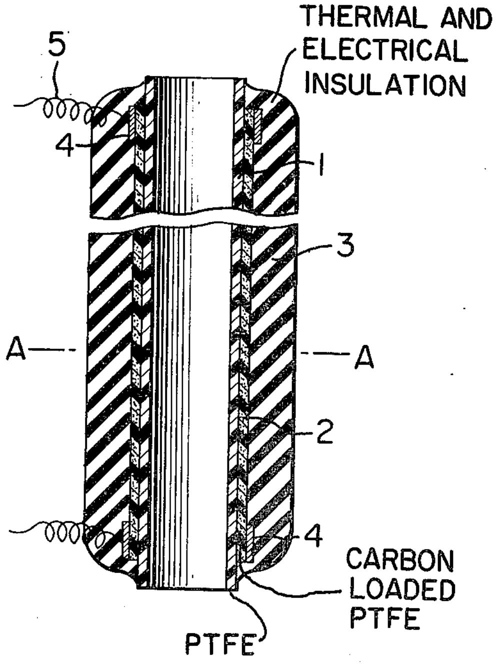
FIG. 2 is a longitudinal cross-section through one embodiment of the invention.
Figure 3:
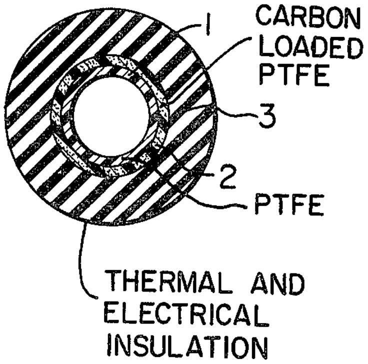
FIG. 3 is a cross-section through line A—A of FIG. 2.

Referring to FIGS. 2 and 3, the electric heating tube of the invention includes an elongated open-ended tubular inner layer 1 of PTFE defining a longitudinally extending fluid passage therein, and an elongated tubular outer layer 2 surrounding the inner layer 1. The outer layer is made of a carbon black filled composition of PTFE. A terminal strip 4 is provided in each end of and in electrical contact with the carbon filled PTFE layer, to which is connected an electrical conductive wire 5. A voltage is applied across the terminals to cause the outer layer 2 to heat, which in turn heats the fluid flowing in the passage.

Figure 1:
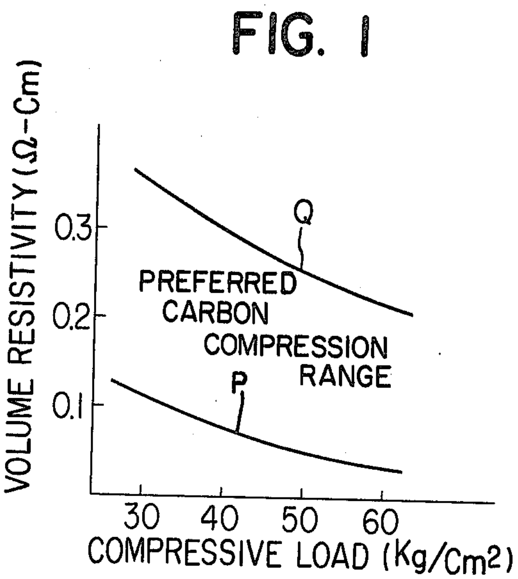
FIG. 1 is a chart plotting resistivity against compressive load of carbon black.

A suitable electrically conductive carbon for the outer layer 2 may generally be characterized by a high structure, a large surface area, a small size and a small volatile matter content. It is preferred that the carbon when compressed falls substantially within an area between the curves P and Q of FIG. 1 which is a plot of compressive load (kg/cm$^2$) against electro-volume resistivity (ohm-cm). The carbon powder which is commercially sold as conductive carbon is suitably usable. The carbon powder is homogeneously dispersed in the outer heat generating layer. The content of the carbon in the heat generating layer is preferably 10 to 50% by weight. It is preferred that the heat generating layer have a volume resistivity of 0.2 to 5.0 ohm-cm.

The thickness of the inner PTFE layer 1 is variable depending on working conditions such as chemical properties of the fluid carried in the tube, heating temperature, etc. In consideration of heat conductivity, the PTFE layer 1 is preferred to be as thin as possible. The thickness is preferably at least 0.1 mm and, in practice about 0.5 to 3 mm.

The outer heat generating layer 2 may be surrounded with a conventional electrical and heat insulation 3, if desired. Though not shown, a protecting PTFE layer may be formed between the outer layer 2 and insulation 3. The terminals 4 are ring electrodes provided at both ends of and on the periphery of the heat generating layer 2. The ring electrode is generally made of a conductive metal plate such as cooper plate. Alternatively, the ring electrode is made of a coating of a composition which comprises a PTFE dispersion, a metal powder such as silver in an amount of 25–90% by weight of the dispersion, and a surface active agent in an amount 10–50% by weight of the metal powder. The conductivity of the terminals 4 may be greater than that of the heat generating layer 2. The electric wire 5, which is connected to each of the terminals to apply voltage from a power source (not shown), is made generally of copper, silver or aluminum. The heating tube according to the invention can be fabricated by several methods, typical of which is a method which includes inserting the PTFE tube 1 into the heat generating tube 2. The tube 2 may be either sintered or non-sintered. When a non-sintered tube is used, sintering is effected after the insertion but, because the tube is reduced in diameter by contraction, the degree of contraction must be taken into account so as to obtain a desired diameter.

The PTFE tube 1 can be prepared by known methods using as starting material so-called PTFE fine powder obtained by an emulsion polymerization of tetrafluoroethylene. For example, the PTFE fine powder is mixed with a hydrocarbon-base liquid lubricant such as solvent naphtha and the mixture is extruded in the form of a pipe or tube (by a so-called paste extrusion technique). The tube obtained after the paste extrusion is heated to remove the liquid lubricant by evaporation and then sintered. The sintering is feasible at temperatures ordinarily employed for sintering PTFE, i.e., at a temperature of 330° C.–400° C., preferably 350° C.–390° C. The carbon filled PTFE tube 2 may also be prepared in like manner.

Alternatively, the electric heating tube of the invention can be suitably fabricated by a single extrusion technique wherein a PTFE composition and a conductive carbon-containing PTFE composition are simultaneously extruded coaxially, followed by sintering. This method is preferable because of uniformity in thickness and quality of the formed tube.

In another alternative, the heating tube may be fabricated by a method which includes providing a metal rod with a smooth surface, winding a non-sintered PTFE tape on the metal rod to a desired thickness, further winding on the PTFE tape a carbon filled non-sintered PTFE tape, attaching electrode terminals, sintering the wound tapes, and removing the metal rod after completion of the sintering. A heating tube including an inner PTFE layer 1, an outer layer 2 and a protecting PTFE layer can be advantageously fabricated by a method which comprises mounting electrodes and the electric wires on the outer layer tube 2, immersing the outer tube 2 in an aqueous PTFE dispersion having a polymer content of 10–60 wt %, removing the tube therefrom, drying the coating thus provided on both sides of the tube and then subjecting the tube to sintering, thereby producing the desired heating tube having the heat generating tube 2 sandwiched between coatings of PTFE.

When the terminals 4 are made of a metal strip, it is sufficient to wind the metal plate around the heat generating layer 2. On the other hand, when the coating composition is used as the electrode terminal, the composition may be applied onto the tube 2 and then sintered. The electric wire 5 can be connected to the terminal 4 by soldering when a metal plate is used as terminal, or, in case of the coating composition, by embedding the wire in the coating layer prior to sintering.

The heat-insulating layer 3 is made of ordinary heat-insulating materials such as glass wool, asbestos, etc., and may be formed by any known technique.

EXAMPLE 1

A PTFE tube having an outer diameter of 6 mm, an inner diameter of 5 mm and a length of 1000 mm was inserted into a carbon filled PTFE tube having an outer diameter of 8 mm, an inner diameter of 6 mm, a length of 1000 mm, an electro-volume resistivity of about 0.6 ohm-cm and a carbon content of 20% by weight. An electrode terminal was attached on the outer tube at each end, to which was connected an electric wire. Then, a heat-insulating material primarily composed of diatomaceous earth and available as "Isolite" (Trademark) was applied over the tube in a thickness of 10 mm to make an electric heating tube as shown in FIGS. 2 and 3.

When 100 V was applied to the heating tube, the output power was found to reach 45 W, ensuring the temperature in the inside of the tube to be maintained at above 150° C. When 300 ml/min of air of high humidity was passed through the tube, the air was heated and the inner tube temperature was held at not less than 100° C. in a steady state.

EXAMPLE 2

Example 1 was repeated except that an electrode terminal was further disposed at the center of the tube for use as a common terminal for both end terminals and 100 V was applied between these terminals. As a result, it was found that the output power was about 176 W. This tube was usable as laboratory water heater, by which 100 ml/min of water could be heated to about 25° C.

EXAMPLE 3

Figure 4:
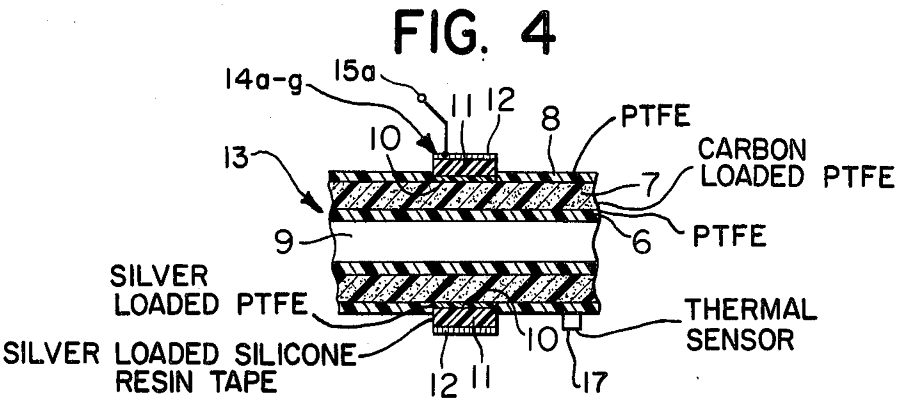
FIG. 4 is a fragmental cross-section through a second embodiment of the invention.

There was fabricated a heating tube used as a conduit for sampling an exhaust gas from the chimney of a plant to a continuous analyzer. The heating tube employed was a triple-wall tube which was made by a simultaneous extrusion molding and which was composed of an intermediate tubular layer containing 20% by weight of conductive carbon and two PTFE tubular layers sandwiching therebetween the intermediate layer. The triple-wall tube is schematically shown in FIG. 4 in partial longitudinal section, together with the section of an electrode. The triple-wall tube of FIG. 4 has a flow passage 9 surrounded by a wall which consists of an inner PTFE layer 6 having an inner diameter of 5.45 mm and outer diameter of 8.21 mm, an intermediate heat generating layer 7 having an outer diameter of 11.48 mm, and an outermost PTFE layer 8 having an outer diameter of 12.24 mm. The tube had a total length of about 6 m and was provided on the outer surface thereof with seven ring electrodes at almost equal intervals of 1 m. The manner of mounting and construction of the electrode will be illustrated with reference to FIG. 4. The outermost PTFE layer 8 was peripherally cut and removed at the seven portions to be provided with the electrodes, respectively, to permit the heat generating layer 7 to be exposed. The seven exposed portions were each coated with a conductive composition obtained by dispersing finely divided silver in an aqueous PTFE dispersion. The thus applied composition was dried and fixed by sintering to form a conductive coating 10 on the each of the exposed areas. The amount of the silver in the composition was 2.7 times as much as that of the PTFE. The sintered coating was found to have high a conductivity of a volume resistivity of $10^{-5}$ ohm-cm.

Figure 5:
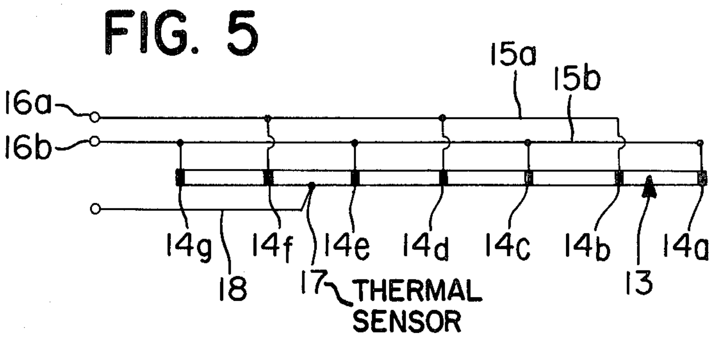
FIG. 5 is a plane view schematically illustrating a circuit used for a third embodiment of the invention.

Then, a conductive elastomer tape 11, composed of a silicone resin matrix having dispersed therein fine silver particles (commercially available as "Chomerics" and having an electro-volume resistivity of $2\times10^{-5}$ ohm-cm), was wrapped on each of the coated portions 10, on over which a metal ring 12 for use as terminal was further provided. The terminals were wired to form the parallel circuit shown in FIG. 5. In FIG. 5, designated at 13 is the triple-wall tube of the invention, at 14(*a*) through 14(*g*) are the terminals, at 15(*a*) and 15(*b*) are wires, at 16(*a*) and 16(*b*) are terminals, at 17 is a thermal controlling sensor, and at 18 is an electric wire for connecting to the sensor 17. After setting the thermal controlling sensor 17 on the outside of the heating tube, the heating tube including the wires and the thermal controlling sensor was wrapped with glass wool for heat insulation and covered further with a polyvinyl chloride bellows hose.

Figure 6:
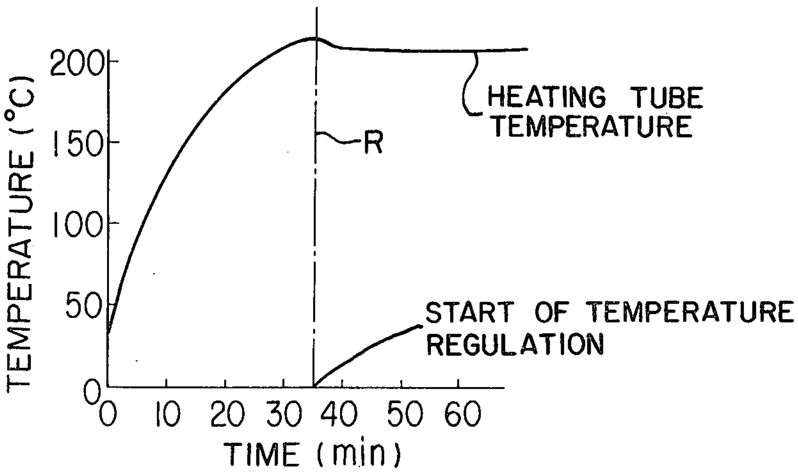
FIG. 6 is a chart plotting inner tube temperature against time and showing an example of a temperature control pattern attained with the use of electric heating tube of the invention.

The triple-wall tube thus wired had an electric resistance of 142 ohm between the respective neighboring electrodes spaced a distance of 1 m, and an electro-volume resistivity of about 0.7 ohm-cm. When the terminals 16(*a*) and 16(*b*) were connected to a power source, the total output power of the heating tube reached 420 W. Immediately after commencement of the application of 100 V to the heating tube, the temperature of the hollow cavity 9 of the tube was measured with time with the results of FIG. 6. During the measurement, neither gas nor liquid was passed through the tube. The inside temperature of the tube was regulated at 215° C. with a thermocouple inserted in the center of the cavity 9. The alternate long and short line R of FIG. 6 indicates commencement of temperature regulation by the termocouple at that point.

It will be noted that the electric heating tube of the invention can be made into any desired shape, i.e. straight, curved or helical.

What is claimed is:

1. A tube adapted for heating a fluid carried therewithin, comprising:

a first elongated tubular layer of polytetrafluoroethylene resin forming the interior surface of the tube and defining a flow passage having a fluid inlet and a fluid outlet;

a second tubular layer surrounding said first tubular layer, said second layer being formed of a homogeneous mixture comprising polytetrafluoroethylene and electrically conductive carbon;

a third tubular layer surrounding said second layer, said third layer being polytetrafluoroethylene formed by coextrusion with said first and second layers; and means for applying a voltage to said second layer thereby generating heat, said means including at least two spaced terminal strips formed on and surrounding said second layer in electrical contact therewith, each of said terminal strips being formed of (1) a dried coating of an aqueous dispersion comprising a finely divided silver and finely divided polytetrafluoroethylene resin in direct contact with said second tubular layer, (2) a silicone resin tape containing dispersed silver particles wrapped around said dried coating in direct contact therewith, and (3) a metal ring fitted over said silicone resin tape in direct contact therewith.

2. The tube as defined in claim 1, wherein said first layer has a thickness of at least 0.1 mm.

3. The tube as defined in claim 1, wherein the content of said electrically conductive carbon in said mixture is from 10 to 50 wt %.

4. The tube as defined in claim 1, wherein said second layer has a volume resistivity of 0.2 to 5.0 ohm-centimeter.

* * * * *